United States Patent
Hoffstadt

[11] 3,839,325
[45] Oct. 1, 1974

[54] SYNTHESIS OF 4-SULFONAMIDOPHENYL HYDRAZINES

[75] Inventor: Walter F. Hoffstadt, Vestal, N.Y.

[73] Assignee: GAF Corporation, New York, N.Y.

[22] Filed: Mar. 23, 1973

[21] Appl. No.: 344,340

[52] U.S. Cl......... 260/239.7, 260/239.6, 260/239.8, 260/397.7 R, 260/247.1, 260/268 S, 260/310 A, 260/326.82, 260/293.73, 260/556 AR
[51] Int. Cl............................................ C07d 87/46
[58] Field of Search....... 260/397.7 R, 239.7, 239.8, 260/239.6

[56] References Cited
FOREIGN PATENTS OR APPLICATIONS
654,111  4/1965  Belgium...................... 260/397.7 R OTHER PUBLICATIONS
C.A. 51:4660e (1957) Grigorovskii et al.
C.A. 64:19347b (1966) Shein et al.
Angen Chem. Internat. Edit 6: 318, 330, 331 (1967) Mareen et al.

Primary Examiner—John D. Randolph
Assistant Examiner—S. D. Winters
Attorney, Agent, or Firm—Walter C. Kehm; Samson B. Leavitt

[57] ABSTRACT

A synthesis is disclosed utilizing p-chlorobenzene-sulfonamide compounds of the following formula:

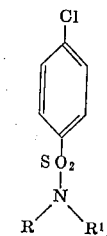

in which R and $R^1$ independently represent hydrogen, alkyl, hydroxyalkyl, cycloalkyl, alkaryl, aralkyl or aryl, which may or may not be further substituted, or together with the nitrogen atom form a heterocyclic ring. These compounds are dissolved in dimethyl sulfoxide (DMSO), mixed with aqueous hydrazine hydrate and heated until completely reacted to form 4 - sulfonamidophenyl hydrazines that can be readily separated from the reaction media by precipitation with water. The precipitate can be readily washed and dried to provide a pure, substituted sulfonamido hydrazine. The product is obtained in high yields frequently of about 80 – 90 percent and is sufficiently pure for subsequent use in the preparation of substituted phenyl pyrazolones which in turn are useful as magenta color formers in color photography. For example, p-chloro-benzene-sulfonyl morpholine is dissolved in DMSO and reacted under reflux conditions with aqueous hydrazine hydrate to form 4 - morpholino - sulfonamido-phenyl hydrazine having a melting point of 162°– 164°C after purification.

10 Claims, No Drawings

SYNTHESIS OF 4-SULFONAMIDOPHENYL HYDRAZINES

The present invention relates to the improved synthesis of an intermediate useful in the production of certain magenta color formers. More particularly, it relates to the economical production, in high yield and at acceptable purity, of substituted 4 - sulfonamidophenyl hydrazines.

The formation of colored photographic images by the coupling of aromatic amino developing agents with color formers or coupling compounds is well known. In these processes, the subtractive process of color formation is ordinarily used, and the image dyes are intended to by cyan, magenta and yellow, the colors that are complementary to the primary colors. The magenta dye image can be formed through the use of a number of magenta color formers of the substituted phenyl pyrazolone series. These color formers, it has been determined, can be prepared using the intermediate 4 - sulfonamidophenyl hydrazine. The intermediate, however, has heretofore been prepared only by relatively costly procedures, utilizing comparatively expensive and unstable reactants. The classical method for preparation of the intermediate involves diazotization of an aromatic amine with subsequent reduction to the hydrazine with sulfites or stannous chloride in hydrochloric acid. The hydrazine thus formed is then generally condensed with an acylacetic acid ester and the final pyrazolone compound formed by ring closure. While the preparation of this intermediate was straightforward, it necessarily involved the use of expensive starting reagents.

A more direct method to form the hydrazine intermediate is by halogen replacement with anhydrous hydrazine. This is effective if the halogenated reactants are activated by strongly negative constituents such as, for example, nitro groups. Belgian patent 654,111 discloses a method of preparing long chain 4 - sulfonamidophenyl hydrazines directly in good yields by reacting para bromo phenyl sulfonamide with anhydrous hydrazine by refluxing in methyl cellosolve. The brominated starting material, however, is relatively expensive and the anhydrous hydrazine is very unstable and difficult to work with. It can be seen that a method of synthesizing such an intermediate utilizing a cheaper starting material and more stable reactants would be extremely desirable.

It is, therefore, an object of this invention to provide a method for synthesizing 4 - sulfonamidophenyl hydrazine products which will not be subject to one or more of the above disadvantages.

Another object is to provide an improved method of synthesizing 4 - sulfonamidophenyl hydrazine in high yield.

Yet, another object of the invention is to provide a process for the production of said 4 -sulfonamidophenyl hydrazine of acceptable purity for use in the production of a magenta color former.

A further object is to provide an economical method of synthesizing 4 - sulfonamidophenyl hydrazine while using relatively cheap and stable reactants.

Other objects and advantages will appear as the description proceeds.

The attainment of the above objects is made possible by this invention which includes an improved method for producing 4 - sulfonamidophenyl hydrazines comprising reacting by heating a substituted p-chlorobenzene-sulfonamide of the following formula (I):

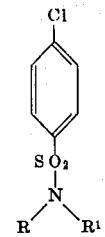

in which R and R$^1$ independently represent hydrogen, alkyl, hydroxyalkyl, cycloalkyl, alkaryl, aralkyl or aryl, which may or may not be further substituted, or together with the nitrogen atom form a heterocyclic ring with aqueous hydrazine hydrate in dimethyl sulfoxide (DMSO).

The subject invention overcomes one or more of the disadvantages of the prior art heretofore described. This is accomplished with the advantage that such synthesis may be more easily performed, uses more economical starting materials and employs more stable reactants, yet results in a higher yield, and a purer product suitable for forming substituted phenyl pyrazolones.

With these and other objects in mind, the invention is hereinafter set forth in detail, the novel features thereof being particularly pointed out in the appended claims.

In the practice of the present invention, a compound of formula (I) above is reacted with aqueous hydrazine hydrate in DMSO at an elevated temperature. The desired product thus formed is soluble in the reaction mixture. It can be readily insolubilized and precipitated by substantial dilution with hot water. The product on cooling crystallizes out of solution and is readily separated from the reaction media. Upon filtration, washing and drying, the desired product is obtained. The product is sufficiently pure for conversion to the corresponding pyrazolone product.

The present invention permits the synthesis of the desired 4 - sulfonamidophenyl hydrazine in high yields, that is on the order of 80 – 90 percent. The desired product is obtained in a readily recoverable form and the novel synthesis of this invention permits the use of relatively low cost chlorinated starting materials and stable, economical reactants, for example, aqueous hydrazine hydrate, thus producing the desired product much more efficiently than prior art processes.

Preferably, in the practice of the invention, the selected p-chlorobenzene-sulfonamide is dissolved in DMSO which has already been mixed with a stoichiometric excess, preferably at least two moles, of aqueous hydrazine hydrate. The mixture is heated to reflux until the reaction is complete, and the mixture is then treated with activated charcoal and filtered. The warm filtrate is diluted with a large volume of hot water and allowed to cool and crystallize. The product is then collected by filtration, washed with water and dried. The yield is generally between 80 – 90 percent.

The reaction of the p-chlorobenzene-sulfonamide is generally carried out at reflux temperatures. However, depending on the concentration of reactants and the chemical nature of the particular substituent, the temperature may vary somewhat. Generally, the temperature is kept between about 110°C and 140°C. The amount of time necessary for a complete reaction will also vary depending upon the reactivity of the starting material from about 4 to about 24 hours. If further purification is desired using charcoal, the solution is filtered while still hot, remaining between about 80° – 110°C. The dilution to initiate precipitation is also generally accomplished at about 80° – 100°C. The product is collected by filtration while cool usually below 20°C, washed with cold water also generally below 20°C and oven dried. The amounts of aqueous diluent and wash water used are not critical and may be arrived at by simple empirical methods which are standard synthetic chemical procedures. An excess of hydrazine hydrate is usually necessary to obtain the completely reacted intermediate. The mole ratio of sulfonamide starting material to hydrazine may vary from about two to ten moles of hydrazine to one mole of starting material. The dilution of starting material by DMSO is not critical but generally enough is desired to facilitate reaction in solution. This dilution may vary from about one to ten parts DMSO by weight to one part reactants. The amount used is generally governed by criteria of efficiency and economy.

Aqueous hydrazine hydrate is a chemical reactant well known to the art. Any convenient concentration, in aqueous solution may be used. Since the reaction is essentially one that takes place in solution, the concentration of hydrazine used must be such that all of the reactants will remain in solution. Generally, this concentration is from 50 – 85 percent. The practical distinction between anhydrous hydrazine and aqueous hydrazine hydrate is the ease of handling the aqueous solution in comparison to the anhydrous material. Further, the aqueous solution is much less expensive than the anhydrous material.

The chemical distinction, with respect to the present invention, is the reactivity of the different types of hydrazine. The hydrate is much less reactive than the anhydrous material. This provides an indication of the surprising character of the invention when compared, for instance, to the brominated sulfonamide of the art previously referred to which was reacted with anhydrous hydrazine. While bromine is more easily replaced than chlorine, a strong reactant such as anhydrous hydrazine was necessary to form the desired product. Using the teaching of this invention, milder reactants can be used successfully.

Dimethyl sulfoxide is used as the solvent and performs a dual function of solvating the reactants and assisting in the elimination of chlorine by the hydrazine. It is found that while the reaction proceeds readily in DMSO, the reaction does not take place with other aprotic solvents such as dimethyl formamide (DMF). This distinction in the use of solvents is readily observed when compared to processes using dimethyl formamide. These processes require an expensive brominated starting material rather than the more economical chlorinated one because the bromine atom is much more reactive than the chlorine.

In the compound of formula (I) above, operative herein, R and/or $R^1$ are preferably hydrogen, lower alkyl or hydroxyalkyl of from one to six carbon atoms, phenyl or phenyl substituted by $C_1$ - 6 alkyl groups. and when R and $R^1$ form a heterocyclic ring, they individually represent the C, O or N atoms necessary to form a five or six membered heterocycle such as morpholine, piperidine, piperazine or pyrrollidine, preferably morpholine or pyrrollidine. Illustrative of some compounds included within this definition are:

N, N - dimethyl - p-chlorobenzene-sulfonamide
N, N - diethyl - p-chlorobenzene-sulfonamide
N - phenyl-p-chlorobenzenesulfonamide
N - methyl-N-phenyl-p-chlorobenzenesulfonamide
N - (p-chlorobenzenesulfonyl) - Morpholine;
N - (beta - hydroxy - ethyl) - p-chlorobenzenesulfonamide);

Desirably, R and/or $R^1$ are selected from the group consisting of hydrogen, hydrocarbon substituents and heterocyclic substituents. Since the reaction is a replacement of chlorine by hydrazine, a significant limiting factor of R and $R^1$ is that these substituents must not completely deactivate the chlorine reaction with hydrazine.

The starting material can be prepared in known manner. For example, the following preparation of p-chlorobenzene-sulfonyl morpholine is illustrative. 1,000 mls. of morpholine, i.e., 11.5 moles, and 1,000 mls. of acetone are added to a 3-liter flask. The flask is fitted with a condenser and a stirring apparatus. This reaction apparatus is then cooled to 15° C, with a running water bath. 460 grams, i.e. 2.18 moles, of p-chlorobenzene-sulfonyl chloride are added portionwise with stirring to the morpholine acetone mixture until reaction is completed. The reaction temperature is kept between 20° and 40° C. during the addition. The raction mixture is then stirred for one hour after the addition is complete. The mixture is transferred to a large container and diluted with four liters of water. The crystals of p-chlorobenzenesulfonyl morpholine are then collected by filtration, washed with cold water and oven dried. This compound is obtained in 93.5 percent yield and has a melting point of 142° – 145° C. The compound, if desired, is treated with charcoal and recrystalized from methanol giving a yield of 75 percent and having a melting point of 148° to 149° C. This compound is then subsequently used in Example 1. It is to be noted that a recrystallization is not necessary to achieve good results.

The following examples will more fully illustrate the embodiments of this invention. All parts and proportions referred to herein and in the appended claims are by weight unless otherwise indicated.

EXAMPLE 1

460 g., i.e. 1.76 moles, of p-chlorobenzene-sulfonyl morpholine prepared in the manner previously described is placed in a ten-liter flask and a mixture of 2,000 ml. of DMSO and 1,000 m., i.e., 17.5 moles, of an 85 percent by weight aqueous hydrazine hydrate solution is slowly added to the flask with continued stirring. The flask is fitted with a reflux apparatus and heated at 127° C, the reflux temperature, for 22 hours. Two grams of activated charcoal is then added to the reaction mixture with continued stirring. The charcoal is allowed to remain in contact with the solution for 10 minutes. The solution is then filtered while still hot. The warm filtrate is then diluted with 6,000 ml. of hot water at a temperature of 90° C. The diluted solution is then cooled to room temperature and chilled to obtain the crystallized product. The product, 4 - sulfonmorpholino phenyl hydrazine, is then collected by filtration, washed with cold water, and oven dried. The yield of white crystalline product is 420 g., that is 80.4 percent. The product has a melting point of 162°–164° C.

An elemental analysis is then performed and the following results are obtained:

| Element | Calculated | Found |
| --- | --- | --- |
| C | 46.68 | 46.87 |
| H | 5.88 | 6.07 |
| N | 16.33 | 15.76 |
| S | 12.46 | 12.57 |

TABLE I*

| Example | Starting Material | Product | Melting Point °C |
| --- | --- | --- | --- |
| 2 | p-chlorobenzenesulfonamide | 4-sulfonamidophenyl hydrazine | 157–159 |
| 3 | N,N-diethyl-p-chlorobenzene-sulfonamide | N,N-diethyl-4-sulfonamido-phenyl hydrazine | 101–102 |
| 4 | N-beta hydroxyethyl-p-chloro-benzenesulfonamide | N-beta hydroxyethyl-4-sulfonamidophenyl hydrazine (isolated as hydrochloride) | 173–4 |
| 5 | N-phenyl-p-chlorobenzenesulfonamide | N-phenyl-4-sulfonamidophenyl hydrazine | 145–7 |
| 6 | N-methyl-N-phenyl-p-chloro-benzenesulfonamide | N-methyl-N-phenyl-4-sulfona-midophenyl hydrazine (isolated as hydrochloride) | 203–205 |

*Following the procedure of Example 1, the above 4-sulfonamidophenyl hydrazines are prepared from the corresponding p-chlorobenzenesulfonamides.

As previously indicated, the 4 - sulfonamidophenyl hydrazine produced in accordance with the process herein recited and claimed is a desirable intermediate having a purity adequate for use in the synthesis of pyrazolone - magenta color formers. For this purpose, the sulfonamido phenyl hydrazine product can be reacted with a beta keto ester and then cyclized to form the desired pyrazolone. Details of these syntheses are given in Vankataraman's book entitled SYNTHETIC DYES, Volume 1, page 607 and following (1952) Academic Press, Inc., New York. For example, 1.6 moles of morpholino 4 - sulfonamido phenyl hydrazine is reacted with 2.2 moles of 3-ethoxy - 3 imino - ethyl propionate hydrochloride to form the corresponding 1 - (4 - sulfonmorpholinophenyl) - 3 - amino - 5 - pyrazolone, according to the equation:

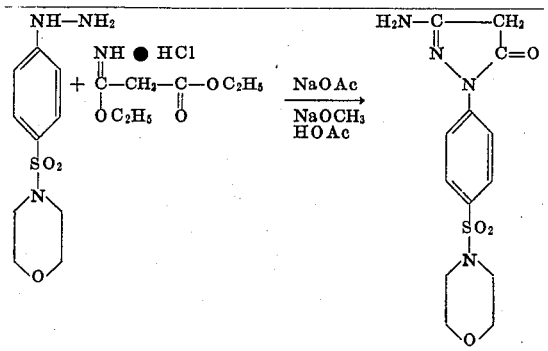

392 g. of the propionate compound is placed in a 5-liter flask containing 1800 ml. of methanol. 180 g., i.e. 2.2 moles, of sodium acetate is then added with stirring followed by 410 g. of the hydrazine compound at ambient temperature (20° – 25°C). This solution is stirred for one hour and a previously prepared solution of 216 g., i.e., 4.0 moles, of sodium methoxide in 1,500 ml. of methanol is added. The solution is stirred for 20 minutes and heated at 50° – 55°C for 5 minutes. 2,000 ml. of water containing 50 g. of sodium hydrosulfite followed by 250 ml. of acetic acid is then added. The solid pyrazolone compound precipitates on this last addition. The solution is cooled and the solid is collected by filtration. The solid has a melting point of 234° – 235°C which on recrystallization is 236° – 238°C.

This invention has been described with respect to certain preferred embodiments and various modifications and variations thereof will become obvious to persons skilled in the art, and are to be included within the spirit and purview of this application and the scope of the appended claims.

What is claimed is:

1. An improved process for the synthesis of a 4-sulfonamidophenyl hydrazine comprising reacting by heating a p-chloro-benzenesulfonamide of the formula

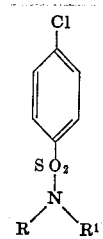

Wherein R and $R^1$ independently represent hydrogen, alkyl, cycloalkyl, alkaryl, aralkyl or aryl, or together with the nitrogen atom form a heterocyclic ring, with aqueous hydrazine hydrate in dimethyl-sulfoxide.

2. A process as defined in claim 1 wherein said reaction is accomplished at a temperature of about 120° to 140° C.

3. A process as defined in claim 1 wherein said reaction is accomplished at reflux temperature.

4. A process as defined in claim 3 wherein the reaction mixture is refluxed for a period of from about 4 to 22 hours.

5. A process as defined in claim 1 wherein the resulting 4-sulfonamidophenyl hydrazine is separated from the reaction mixture by adding water at a temperature of less than 100° C to insolubilize and precipitate said 4-sulfonamidophenyl hydrazine.

6. A process as defined in claim 1 wherein at least two moles of said hydrazine hydrate are employed per mole of said p-chlorobenzenesulfonamide.

7. A process as defined in claim 1 wherein said aqueous hydrazine hydrate is employed in a molar ratio from about 2 to 10 moles for each mole of said p-chlorobenzenesulfonamide.

8. A process as defined in claim 1 wherein R and $R^1$ independently represent hydrogen, $C_{1-6}$ alkyl, phenyl, $C_{1-6}$ alkyl substituted phenyl or, when taken together with the nitrogen atom to which they are attached, form a five to six membered heterocyclic ring containing said nitrogen atom as the sole hetero atom or containing a further nitrogen atom or an oxygen atom as a second hetero atom.

9. A process as defined in claim 8 wherein said heterocyclic ring is selected from the group consisting of morpholino, piperidino, piperazino and pyrrolidino.

10. A process as defined in claim 1 wherein said p-chlorobenzenesulfonamide is selected from the group consisting of p-chlorobenzenesulfonamide, N.N. - diethyl - p-chlorobenzenesulfonamide, N -(p-chlorobenzenesulfonyl) -morpholine, N - beta hydroxyethyl-p-chlorobenzenesulfonamide, N - phenyl-p-chlorobenzenesulfonamide, N -methyl-N-phenyl-p-chlorobenzenesulfonamide, and N - (p-chlorobenzenesulfonyl) -pyrrollidine.

* * * * *